US006892118B1

(12) United States Patent
Feyereisen

(10) Patent No.: US 6,892,118 B1
(45) Date of Patent: May 10, 2005

(54) PICTOGRAPHIC MODE AWARENESS DISPLAY FOR AIRCRAFT

(75) Inventor: Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/231,887

(22) Filed: Aug. 30, 2002

Related U.S. Application Data

(60) Provisional application No. 60/322,198, filed on Sep. 13, 2001.

(51) Int. Cl.[7] .......... G06F 19/00

(52) U.S. Cl. .......... 701/14; 701/4; 33/324; 33/328; 342/29

(58) Field of Search .......... 701/14–16, 3, 701/11, 4, 5, 18, 206, 220; 340/971–979, 945, 959, 960; 33/324, 328, 329; 342/29

(56) References Cited

U.S. PATENT DOCUMENTS 4,827,419 A * 5/1989 Selby, III .......... 701/200
5,265,024 A * 11/1993 Crabill et al. .......... 701/200
5,978,715 A * 11/1999 Briffe et al. .......... 701/11
6,262,720 B1 * 7/2001 Jeffrey et al. .......... 345/710
6,381,519 B1 * 4/2002 Snyder .......... 701/3
6,405,107 B1 * 6/2002 Derman .......... 701/3
6,466,235 B1 * 10/2002 Smith et al. .......... 345/771
6,473,003 B2 * 10/2002 Horvath et al. .......... 340/945
6,473,676 B2 * 10/2002 Katz et al. .......... 701/4

* cited by examiner

*Primary Examiner*—Thomas G. Black
*Assistant Examiner*—Ronnie Mancho

(57) ABSTRACT

A device, method and computer program for generating and displaying graphical displays symbolic of current and available operational modes of instrument systems, such as navigation and autopilot systems. Accordingly, the method of the invention includes receiving a signal representative of a current mode of operation of one or more instrument systems, interpreting the current mode of operation signal to determine the current mode of operation, outputting a control signal informing a pictographic representation symbolic of the current mode of operation, and displaying the pictographic representation of the current mode of operation on a display device, such as a cockpit panel display.

47 Claims, 6 Drawing Sheets

100 IAS VS 10 110 114 108 170 140 130 8 117 6 110 100 10 10 112 104 3000 1150 30 1120 110 10 1050 118 102 116 10 10 360° 360 330 030 106

PICTOGRAPHIC MODE AWARENESS DISPLAY FOR AIRCRAFT

This application claims the benefit of U.S. Provisional Application Ser. No. 60/322,198, entitled "Pictograph to Enhance Mode Awareness for Aircraft Cockpit Display," and filed in the name of Thea L. Feyereisen on Sep. 13, 2001, the complete disclosure of which is incorporated herein by reference.

FIELD OF THE INVENTION

The present invention relates to devices and methods for operation of aircraft navigation and autopilot systems, and in particular to annunciation of modes of operation of aircraft navigation and autopilot systems.

BACKGROUND OF THE INVENTION

In modern aircraft having integrated cockpits, discrete navigation and autopilot systems operate separately, but work together. One major concern with navigation and autopilot systems is pilot mode awareness. Excessive intricacies and mode proliferation in modern aircraft navigation and autopilot systems make it difficult for pilots to understand system operation in each of multiple different operational modes. Annunciation of the different operational modes is provided to help the pilot to understand. Mode annunciation is integrated for the separate navigation and autopilot systems, with operational mode annunciation being provided by a single annunciation. Presently, operational mode annunciation is accomplished using only alphanumeric text which is presented on one of the cockpit displays. For example, the characters "VS" are presented on a cockpit display such as a primary flight display (PFD) to indicate current operation in the vertical speed mode, the characters "IAS" are presented to indicate operation in the indicated air speed mode, and the characters "FPA" are presented to indicate operation in the flight path angle mode.

Other modes include vertical navigation (VNAV) mode whereby the aircraft flies according to a stored set of vertical waypoints that are preprogrammed in a flight management computer system (FMCS), altitude hold (ALT) mode for maintaining current altitude, flight level change (FLCH) mode for changing flight level, and other flight modes. There can be in excess of 20 different alphanumeric mode enunciators, which are a combination of numerous control parameters involving different aircraft attitude, speed, and thrust settings. While these and other alphanumeric mode enunciators are helpful, they require the pilot to expend resources interpreting their significance before the information can be used.

SUMMARY OF THE INVENTION

The present invention is an apparatus, method and computer program that enhances pilot awareness and understanding of information displayed on the instrument systems, such as navigation and autopilot systems, by providing mode enunciators in the form of a visual graphic interface. The present invention thus provides a pictogram-based pilot interface for mode annunciation that overcomes the limitations of the prior art text presentation by providing a graphic representation of mode having a cognitive advantage over text presentation which thereby increases navigation and autopilot instrument mode awareness.

According to one aspect of the invention, a pictographic display is provided having first and second coexisting adjacent display portions; first pictographic symbology associated with the first display portion and being representative of a currently operational state of an instrument; and second pictographic symbology associated with the second display portion and being representative of a currently armed but non-operational state of the instrument.

According to another aspect of the invention, a pictographic display of an operational mode of an instrument or instrument system is provided, the pictographic display including: a graphical display device and a pictographic symbol displayed on the display device, the pictographic symbol including at least two or more of an enunciator symbolic of a current operational state of the instrument or instrument system, an enunciator symbolic of a next operational state of the instrument or instrument system, and an enunciator symbolic of a current mode of flight of an aircraft having the display device resident thereon.

According to another aspect of the invention, an aircraft cockpit display is provided having a memory having a plurality of machine instructions stored thereon for generating a display control signal representative of a pictographic enunciator symbolizing a current operational state of an onboard instrument or instrument system; a processor coupled to receive a signal representative of a currently operational mode of the onboard instrument or instrument system, the processor being further coupled to retrieve and operate the plurality of machine instructions stored on the memory for generating the pictographic enunciator display control signal; a display generator coupled to receive display control signal, the display generator being structured to interpret the display control signal to generate the pictographic enunciator; and a graphical display device coupled to the display generator and structured to display the pictographic enunciator.

According to still another aspect of the invention, a method is provided for generating a pictographic representation of an operational mode of an instrument, the method including receiving a signal representative of a currently operational mode of operation of an instrument system; determining the currently operational mode of operation of the instrument system; generating a control signal informing a pictographic representation symbolic of the currently operational mode of operation; and outputting the currently operational control signal.

According to yet another aspect of the invention, a computer program is provided, the computer program having a first computer-readable program code means for receiving a signal representative of a current mode of operation of one or more instrument systems; a second computer-readable program code means for determining a current mode of operation of the instrument system from the current mode of operation receive by the first computer-readable program code means; and a third computer-readable program code means for generating and outputting a display control signal informing a pictographical representation symbolic of the current mode of operation determined from the second computer-readable program code means.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the figures, like numerals indicate like elements.

The present invention is a device, method and computer program for generating and displaying graphical displays symbolic of current and available operational modes of instrument systems, such as navigation and autopilot systems. Accordingly, the method of the invention includes receiving a signal representative of a current mode of operation of one or more instrument systems, interpreting the current mode of operation signal to determine the current mode of operation, outputting a control signal informing a pictographic representation symbolic of the current mode of operation, and displaying the pictographic representation of the current mode of operation on a display device, such as a cockpit panel display.

Figure 1:
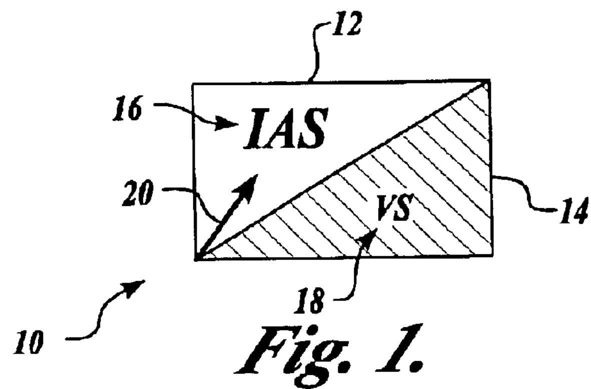
FIG. 1 illustrates the pictographic instrument system mode enunciator of the present invention embodied as a pictogram that announces in pictographic symbology the current mode of operation of one or more instrument systems.

FIG. 1 illustrates the pictographic instrument system mode enunciator of the present invention embodied as a pictogram that announces in pictographic symbology the current mode of operation of one or more instrument systems. In a modern aircraft, the pictogram may announce in integrated pictographic symbology the current operational mode of the separate navigation and autopilot systems. For example, the pictogram illustrated in FIG. 1 indicates a climb in an Indicated Air Speed (IAS) current mode of operation of the navigation and autopilot systems using integrated pictographic symbology. The pictogram illustrated in FIG. 1 is only one example of how the instrument system pictographic operational mode enunciator of the present invention can be implemented. The instrument system operational pictographic mode enunciator of the present invention can be implemented in many different ways, and the implementation used in FIG. 1 to illustrate the invention does not in any way limit the claimed invention.

The instrument system pictographic operational mode enunciator of the present invention as implemented in the exemplary embodiment of FIG. 1 includes a pictogram 10 having a first portion or area 12 and a second coexisting adjacent portion or area 14. Each of the first and second areas 12, 14 of the pictogram 10 includes a visual alphanumeric enunciator 16, 18, shown respectively as "IAS" meaning indicated air speed mode and "VS" meaning vertical speed mode. In the exemplary embodiment of FIG. 1, the instrument system is operational in the IAS mode as indicated by the alphanumeric operational mode enunciator 16 located in the first area 12 of the pictogram 10. The current operational mode is visually highlighted or emphasized to draw the pilot's attention and symbolize the active operational status of the instrument or instruments, while an inactive or non-operational mode is visually de-emphasized to avoid drawing the pilot's attention and to symbolize a deactivated or non-operational state. For example, the alphanumeric operational mode enunciator 16 that announces the current mode of operation of an instrument system is shown for visual emphasis in emboldened or enlarged or emphatically colored or shaded font, or a combination of one or more of emboldening, enlarging and emphatically coloring the font, or another means of emphasizing font on a cockpit display such as to draw the attention of a pilot. The visual alphanumeric enunciator 18 that announces the currently non-operational mode is visually de-emphasized using unemboldened or unemphatically colored or shaded or ordinarily sized font, or a combination of two or more, in contrast to the emphasized alphanumeric operational mode enunciator 16 that announces the current mode of operation.

Furthermore, the first area 12 showing the current operational mode is visually emphasized using an emphatic coloring or increased illumination brightness, or both, (shown as unshaded) that is selected to draw the pilot's attention. The emphatic color is, for example, a color normally selected to indicate an active or operational state, such as green ???.

The coloring or illumination, or both, of the second area 14 showing the currently non-operational mode is contrasted with that of the visually emphasized operational mode area 12 showing the current operational mode in order to visually de-emphasize the currently non-operational mode. For example, the area 14 showing the currently non-operational mode is visually de-emphasized using an unemphatic color or dimmer illumination, or both, (shown as shading) that is different from the visually emphasized operational mode area 12. The unemphatic color of the non-operational mode area 14 is, for example, a color normally selected to indicate an inactive or non-operational state, such as yellow, while the brightness illuminating the non-operational mode area 14 may be decreased relative to the brightness illuminating the area 12 showing the current operational mode.

According to one embodiment of the invention, the visually emphasized operational mode area 12 showing the current operational mode further includes a visual directional enunciator 20 that is used to visually indicate current vertical direction or mode of flight, whether level, ascending or descending. According to the present invention, the visual directional mode enunciator 20 is implemented using pictographic symbology that is commonly associated with ascending/descending mode, which reduces the cognitive resources required of the pilot to interpret the information. In the exemplary pictogram 10 of FIG. 1 for example, the visual directional mode enunciator 20 is implemented as a pointer device, such as an arrow, which is pictographic symbology that is cognitively associated with direction so that it is quickly and easily interpreted as a directional indicator. Thus, according to the exemplary embodiment of FIG. 1, the upwardly pointing directional enunciator arrow 20 symbolically indicates a current climbing or ascending mode of flight.

The instrument system pictographic operational mode enunciator of the present invention as implemented using the pictogram 10 of FIG. 1 thus indicates that the aircraft is currently in a climb and that the aircraft navigation and autopilot systems are currently operational in the IAS (Indicated Air Speed) mode.

The pictogram 10 of FIG. 1 indicates that the aircraft is currently in a climb by the upwardly pointing directional enunciator arrow 20 situated within the area 12 indicating the current operational mode of the aircraft navigation and autopilot systems. The pictogram 10 further indicates that the aircraft navigation and autopilot systems are currently operational in the Indicated Air Speed mode by the emphasized alphanumeric operational mode enunciator 16 reading "IAS" (shown as emboldened and enlarged and darkly colored or shaded font) being situated within the emphasized operational mode area 12 (shown as unshaded to indicate an emphasizing color or increased brightness). The pictographic instrument system mode enunciator of the present invention embodied as the pictogram 10 of FIG. 1 thus clearly indicates the current mode of operation of the aircraft navigation and autopilot systems using pictographic symbology that is commonly associated with active and inactive states and with direction, thereby reducing the cognitive resources required of the pilot to interpret the displayed mode and direction information.

Figure 2:
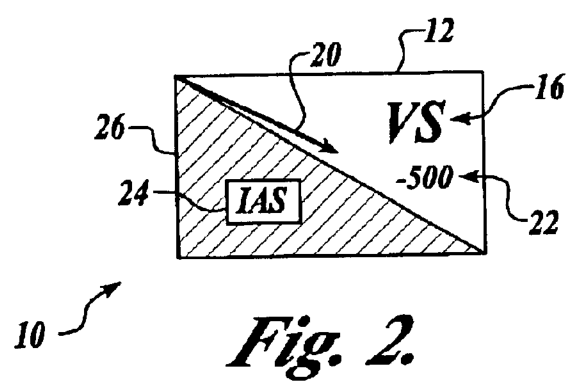
FIG. 2 is another illustration of the pictographic instrument system mode enunciator of the present invention embodied as another version or state of the pictogram of FIG. 1 for indicating descent in a Vertical Speed (VS) mode.

FIG. 2 is another illustration of the pictographic instrument system mode enunciator of the present invention embodied as another version or state of the pictogram 10 for indicating descent in the Vertical Speed (VS) mode. The descent is indicated by the directional mode enunciator 20 embodied as a downwardly pointing arrow. The currently active aircraft navigation and autopilot systems are currently operational in the vertical speed mode as indicated by the emphasized alphanumeric operational mode enunciator 16 reading "VS," the emphasis being embodied as one or more of emboldened font, enlarged font, and emphatically, i.e., darkly or brightly, colored or shaded font, or another means of emphasizing font on a cockpit display such as to draw the attention of a pilot. The current operational mode is further indicated by being situated within the emphasized operational mode area 12 of the pictogram 10, the emphasis being one or more of a color and brightness of the display selected to draw the attention of a pilot and symbolize the instruments' active or operational status.

The pictogram 10 as embodied in FIG. 2 also informs the pilot of the currently selected vertical speed or vertical rate of change, i.e., level, ascent or descent, by providing another visually emphasized alphanumeric enunciator 22. The visually emphasized alphanumeric current vertical speed enunciator 22 is embodied as being situated proximate to the emphasized alphanumeric operational mode enunciator 16 and showing a numeric enunciator portion for indicating rate of vertical change in combination with a prefixual sign indicating direction of vertical change. The prefixual sign is, for example, a minus "−" which is commonly associated with negative change or descent. A plus "+" prefixual sign for ascent is optional because an unsigned numeric enunciator is commonly associated with positive change or ascent, thereby reducing any need for the positive prefixual sign portion. The visual emphasis on the alphanumeric directional vertical speed enunciator 22 is embodied as one or more of an emboldened font, an enlarged font, and a darkly or brightly colored or shaded font, or another means of visually emphasizing font on a cockpit display such as to draw the attention of a pilot, similarly to the visual emphasis on the alphanumeric operational mode enunciator 16 as described herein.

In the exemplary embodiment illustrated in FIG. 2, the alphanumeric directional vertical speed enunciator 22 is illustrated as reading "−500," which indicates a negative vertical rate of change, i.e., a descent, at a rate of 500 feet per minute, feet per minute (FPM) being the units commonly used for vertical speed. The emphasis of the vertical speed enunciator 22 being embodied as one or more of emboldened and enlarged emphatically colored or shaded font (shown as bold black font).

The aircraft navigation and autopilot systems are known to shift between modes generally as a function of phase of flight. For example, when the aircraft is flying in a level phase, the navigation and autopilot systems may operate in a FPA mode, but may shift to a VS mode when the aircraft changes to a descent phase of flight. The pictographic instrument system mode enunciator of the present invention as embodied by the pictogram 10 of FIG. 2 also includes an predictive indication of mode transitions that is embodied as an emphasized alphanumeric enunciator 24 situated in a predictive portion or area 26 coexisting with and adjacent to the emphasized area 12 showing the current operational mode of the instrument system or systems. The emphasized alphanumeric enunciator 24 provides predictive or armed mode information by indicating the control priorities that are currently available, for example, vertical speed mode, flight path angle mode, and indicated air speed mode (shown). The alphanumeric armed mode enunciator 24 is emphasized to indicate its armed status, the emphasis being embodied similarly to the alphanumeric operational mode enunciator 16 and the alphanumeric directional vertical speed enunciator 22, as described herein. For example, the alphanumeric armed mode enunciator 24 is emphasized to indicate its armed status using one or more of an emboldened font, an enlarged font, and an emphatically colored or shaded font, or another means of emphasizing font on a cockpit display such as to draw the attention of a pilot.

The armed mode is indicated as currently non-operational by situating the armed mode enunciator 24 in the predictive area 26 of the pictogram 10. In contrast to the adjacent emphasized area 12 showing the current operational mode, the predictive area 26 is de-emphasized using coloring or illumination, or both, that contrasts with that of the emphasized area 12 showing the current operational mode. For example, the predictive area 26 showing the currently armed but non-operational mode is de-emphasized using a shading or coloring or dimmer illumination, or a combination, (shown as shading) that is different from the emphasized operational mode area 12. The de-emphasizing color of the predictive area 26 is, for example, a color normally selected to indicate an inactive or non-operational state, such as yellow, while the brightness illuminating the predictive area 26 may be decreased relative to the brightness illuminating the first area 12 showing the current operational mode.

However, the de-emphasizing shading, coloring or dimness of the predictive area 26 may be interrupted in the area of the armed mode enunciator 24 that announces the non-operational but armed mode. The emphasis on the armed mode enunciator 24 is thereby increased, while the clear indication of its non-operational status is retained through the surrounding de-emphasized area of the predictive area 26.

Thus, instead of presenting the pilot with just the currently operational mode, as known operational mode annunciation of navigation and autopilot systems is presently accomplished, the pictographic instrument system mode enunciator of the present invention also presents a predictive indication of mode transitions. The pictographic mode enunciator of the present invention integrates both currently operational mode and predictive or armed mode information. The pictographic mode enunciator of the present invention informs the pilot of the control priorities, such as vertical speed mode, airspeed mode, and indicated air speed mode, that are available, informs the pilot of which mode is currently engaged, and also indicates a mode transition. The mode pictogram of the present invention thus reduces the cognitive resources required of the pilot to interpret the mode information, making it easier for pilots to understand autopilot and navigation control priorities.

Figure 3:
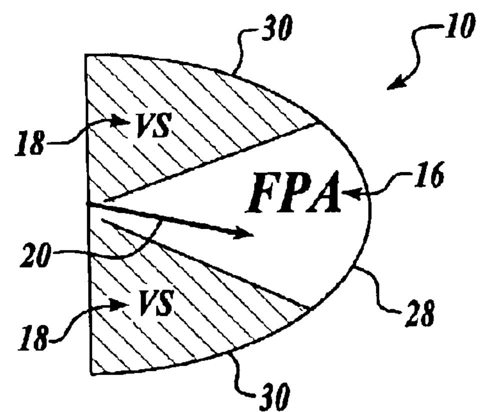
FIG. 3 is another illustration of the pictographic instrument system mode enunciator of the present invention embodied as yet another version or state of the pictogram of FIG. 1 for indicating descent in the Flight Path Angle (FPA) instrument operational mode.

FIG. 3 is another illustration of the pictographic instrument system mode enunciator of the present invention embodied as yet another version or state of the pictogram 10 for indicating descent in the Flight Path Angle (FPA) instrument operational mode. The pictogram 10 is drawn having curved operational and non-operational portions or areas 28 and 30, in contrast to the generally rectangular version of the pictogram 10 as embodied in the illustrations of FIGS. 1 and 2 having triangular operational and non-operational areas 12, 14. In the version of the pictogram 10 shown in FIG. 3, the descent is indicated by the directional mode enunciator 20 embodied as a downwardly pointing arrow, which is situated within the emphasized operational area 28 of the pictogram 10. The currently engaged operational mode is indicated by the emphasized alphanumeric operational mode enunciator 16, which is also situated within the emphasized currently area 28. Emphasis is provided for the emphasized operational area 28 using emphatic coloring or increased illumination brightness, or both, (shown as unshaded) that is selected to draw the pilot's attention and symbolize the active operational status of the instruments, similarly to the emphasized operational area 12 shown in FIGS. 1 and 2. Emphasis is provided for the alphanumeric operational mode enunciator 16 as described herein.

Furthermore, in the embodiment of FIG. 3, the inactive or non-operational mode enunciators 18 are dc-emphasized to avoid drawing the pilot's attention, as well as being situated within the de-emphasized areas 30 of the pictogram 10 to indicate the currently non-operational status of the mode. The non-operational mode enunciators 18 are de-emphasized as described herein. The areas 30 showing the currently non-operational mode are contrasted with that of the emphasized operational mode area 28 similarly to the de-emphasized non-operational mode area 14 shown in FIGS. 1, 2 and described herein. For example, the non-operational mode areas 30 are de-emphasized using a color or dimmer illumination, or both, (shown as shading) that is different from and contrasts with the emphasizing color or illumination, or both, used in the operational mode area 28.

The pictographic instrument system mode enunciator of the present invention can be located on the Primary Flight Display or any other display in the cockpit. For example, the pictographic instrument system mode enunciator of the present invention can be located on a Attitude Direction Indicator (ADI), which is a dedicated display where the textual mode annunciations are displayed according to the prior art technologies. Alternatively, a Flight Mode Annunciator (FMA) of advanced design may be a microprocessor-based display having line select keys and a soft graphic interface that is capable of displaying the pictographic instrument system mode enunciator of the present invention. The pictographic instrument system mode enunciator of the present invention can also be located for illustration purposes only and without limitation on a cockpit display which is, for example, a Primary Flight Display (PFD).

Figure 4:
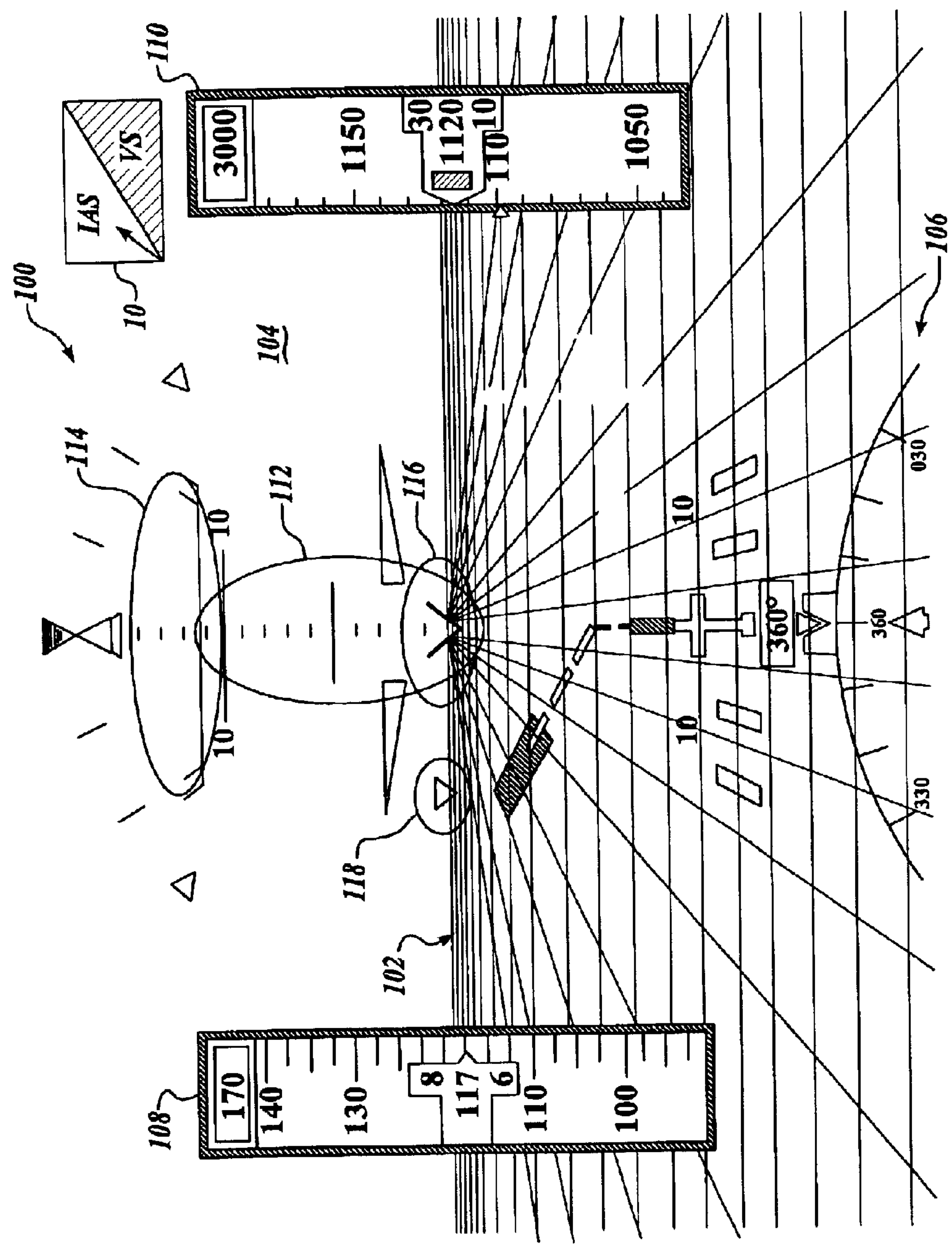
FIG. 4 illustrates by example and without limitation the pictographic instrument system mode enunciator of the present invention embodied as the pictogram of FIG. 1 as displayed on a graphical cockpit display embodied as, for example, a Primary Flight Display (PFD)

FIG. 4 therefore illustrates by example and without limitation the pictographic instrument system mode enunciator of the present invention embodied as the pictogram 10 illustrated in FIG. 1 and displayed on a graphical cockpit display embodied as, for example, a Primary Flight Display (PFD) 100. A suitable PFD is the Honeywell DU-1080 Display Unit, which is a color active matrix liquid crystal display based device 10.4" diagonal in size which is available from Honeywell International, Inc. of Morristown, N.J. Alternatively, the pictogram 10 is displayed on a Head Up Display (HUD), which is, for example, the HUD2020 also available from Honeywell International, Inc. Many other displays are also suitable for practicing the pictographic instrument system mode enunciator of the invention; the Honeywell DU-1080 Display Unit and HUD2020 unit being only examples used to demonstrate the invention and not intended in any way to limit the scope of the invention.

The display 100 includes a number of features that are briefly explained to provide context for the pictographic instrument system mode enunciator display of the present invention.

The display 100 also presents texturing and perspective lines 102 on the ground and color gradations (not shown) on both ground (using shades of brown for example) and sky 104 (using shades of blue for example). Horizontal and longitudinal perspective line segments 106 are superimposed on the ground, which is appropriately colored, for example, brown. The longitudinal lines are extended to a common vanishing point on the horizon. A random texture (not shown) may be superimposed on top of the brown ground to further enhance perception.

During VMC, pilots perceive movement and distance by combining evidence about texture, perspective, and color changes. These same immergent features, i.e., texture, perspective, and color, are recreated and integrated in the display 100. The display 100 thus reproduces an "optical flow," a momentary velocity of texture and/or grids across the visual field that the pilot perceives close to the ground. Color gradations are presented in the sky 104 that replicate color gradations on a clear blue day and facilitate pre-attentive processing for depth perception as well as indications for unusual attitude recovery. Perspective lines 102 are presented to assist depth perception. This integrated picture of texture, perspective, and color cues assists situation awareness by modeling on the display an internalized mental model of current and projected state of the flight environment.

The display 100 may include a compass 106 having a directional indicator and an alphanumeric current compass direction enunciator displayed thereon. The display 100 may include speed and altitude scales or tapes 108, 110 for indicating speed over the ground and barometric or radio altitude, respectively. The display 100 may also include expanded lateral and vertical horizons and a conformal pitch scale or tape shown at 112. The pitch tape and horizon at 112 display a conformal attitude using, for example, 1 degree on the display as being equivalent to 1 degree on the window. The pitch tape 112 uses solid colored (light blue) ticks for positive pitch and differently colored (brown) ticks for negative pitch. Additionally, light blue colored ticks appear on the horizon line at every 10 degrees.

The ball/attitude indicator 112 is as large as the display 100 permits. Larger displays permit a pilot to more easily discriminate upsets to pitch by increasing peripheral field of view. The quicker a pilot can detect a disturbance, the quicker a corrective action can be made, and therefore, overall performance, i.e., on track, on altitude, on speed, is improved. Additionally, overall workload is reduced because the quicker the pilot catches a problem, the quicker it can be resolved so that less cognitive and physical exertion is required to maintain course. Safety is also improved. In the example of windshear, if a pilot detects it early, e.g., by disturbance to intended attitude and path, an unrecoverable condition is less likely to occur. The use of conformal symbology thus provides visual momentum to out-the-window-view.

A conformal pitch limit indicator (PLI) 114 provides visual cues to the approach of stall conditions. The PLI 114 is positioned conformally about the pitch ladder on the center of the display 100 and operates at the same attitude that a stick shaker, if present, would start to shake. Spatial disorientation occurs when a pilot is deprived of visual references to determine the aircraft's orientation in space. A stall/spin or a stall/mush may be a fatal result if directional control is lost because the pilot is not aware of the bounds of pitch. Around one half of general aviation (GA) accidents are attributable to lost control or the stall/spin/mush condition. The conformal PLI 114 is a very salient cue and dramatically increases awareness of approach to stall condition, and thus enhances safety.

During Visual Meteorological Conditions (VMC), pilots often use landmarks, e.g., a mountain peak, on the horizon as a guide to a destination. These visual landmarks provide situation awareness. When flying Instrument Meteorological Conditions (IMC), these landmarks are not available. The display 100 thus provides a lateral conformal current waypoint 116 represented as a colored triangle on the horizon. The lateral conformal current waypoint cue 116 replicates an element common to visual flight. The lateral conformal current waypoint 16 thus contributes to visual momentum, thereby increasing situational awareness (SA), which can be defined as perception of elements in the environment within a volume of time and space and the projection of their status in the near future.

A conformal next waypoint 118 is presented on the display 100 being represented as a smaller, differently colored triangle on the horizon. As mentioned, situation awareness or SA can be defined as the perception of elements in the environment within a volume of time and space and the projection of their status in the near future. Current and next waypoints 116, 118 thus provide tactical situation awareness.

According to the invention, a pictographic operational mode enunciator is provided on the display 100 aircraft display embodied as the pictogram 10 illustrated in any of FIGS. 1–3 (FIG. 1 shown) or another embodiment of the pictographic operational mode enunciator of the invention.

As discussed above, the pictographic operational mode enunciator of the invention provides easily and quickly interpreted current and armed mode information about the autopilot and navigation systems, which is especially useful for helping pilots to understand autopilot and navigation control priorities. The configuration illustrated in FIG. 4 also indicates a climb in an Indicated Air Speed (shown as "IAS" abbreviation) current mode of operation. Pilot response time is quicker because of the pre-attentive information that the pictographic mode enunciator of the invention provides.

Figure 5:
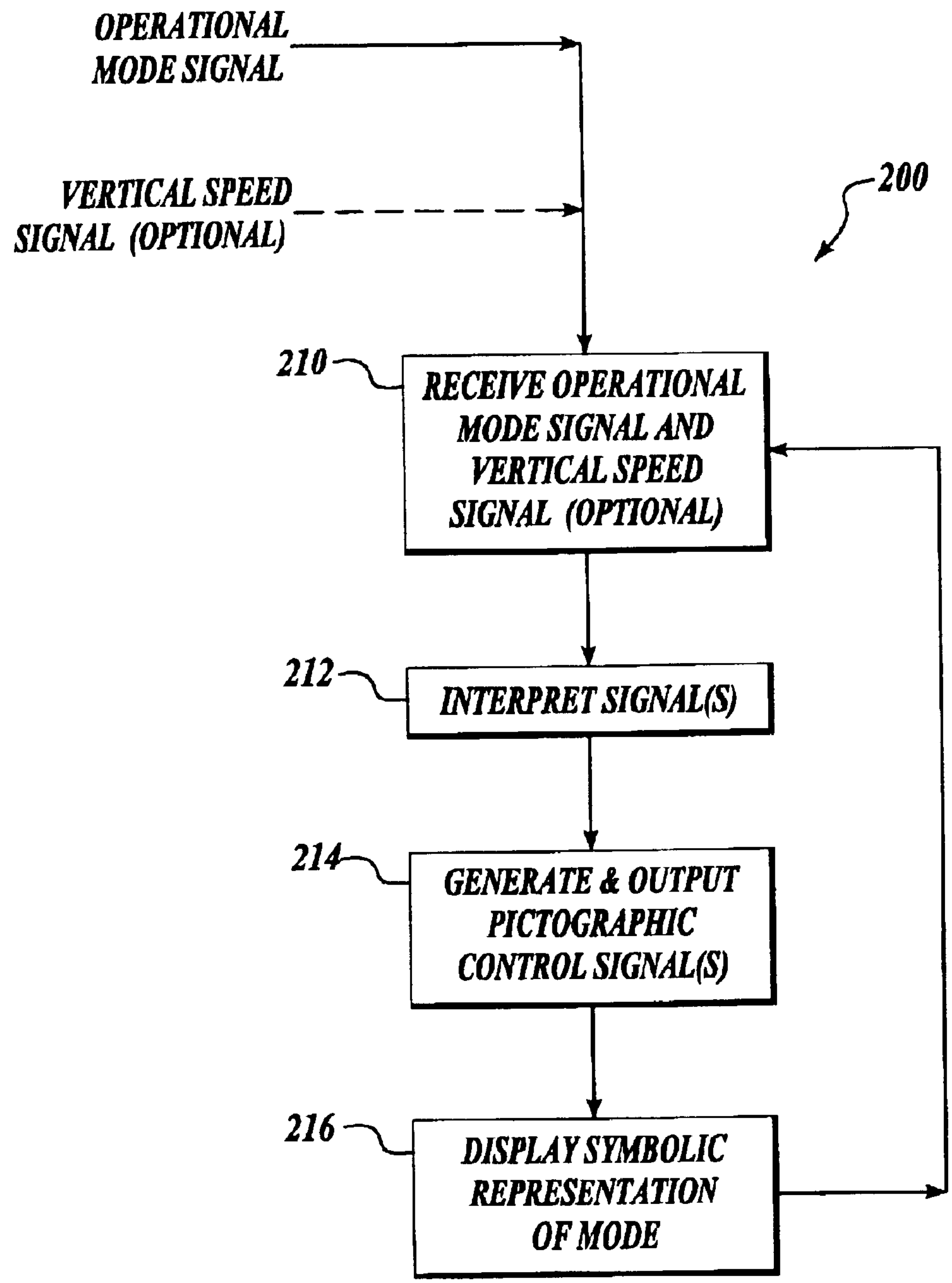
FIG. 5 illustrates by example and without limitation the pictographic operational mode enunciator system of the invention embodied in a flowchart.

FIG. 5 illustrates by example and without limitation the pictographic operational mode enunciator system of the invention embodied in a flowchart 200. Accordingly, the method of the invention includes in Block 210 receiving a signal representative of a current mode of operation of an instrument system such as a navigation or autopilot instrument system. In Block 212 the received current mode of operation signal is interpreted to determine the current mode of operation of the system. In Block 214 a display control signal informing a pictographical representation symbolic of the current mode of operation is generated and output. In Block 216 the pictographical representation of the current mode of operation, i.e., the current mode enunciator 16, is displayed in an emphasized format on a cockpit panel display, such as the PFD 100 illustrated in FIG. 4.

Optionally, when the current operational mode is determined to be in the vertical speed mode, the method of the invention includes in Block 210 receiving a signal representative of a current vertical speed of the aircraft. In Block 212 the received current vertical speed signal is interpreted to determine the current vertical speed of the aircraft. In Block 214 a control signal informing the alphanumeric representation symbolic of the value of the current vertical speed, as illustrated in FIG. 2, is generated and output. In Block 216 the alphanumeric representation of the value of the current vertical speed, i.e., the alphanumeric current vertical speed enunciator 22, is displayed on the cockpit panel display in combination with the pictographical representation of the current mode of operation, i.e., the current mode enunciator 16.

The system loops to continuously sample the current mode and vertical speed (optional) signals whereby the displayed pictographical representation of the current mode of operation and vertical speed are continuously updated.

Figure 6:
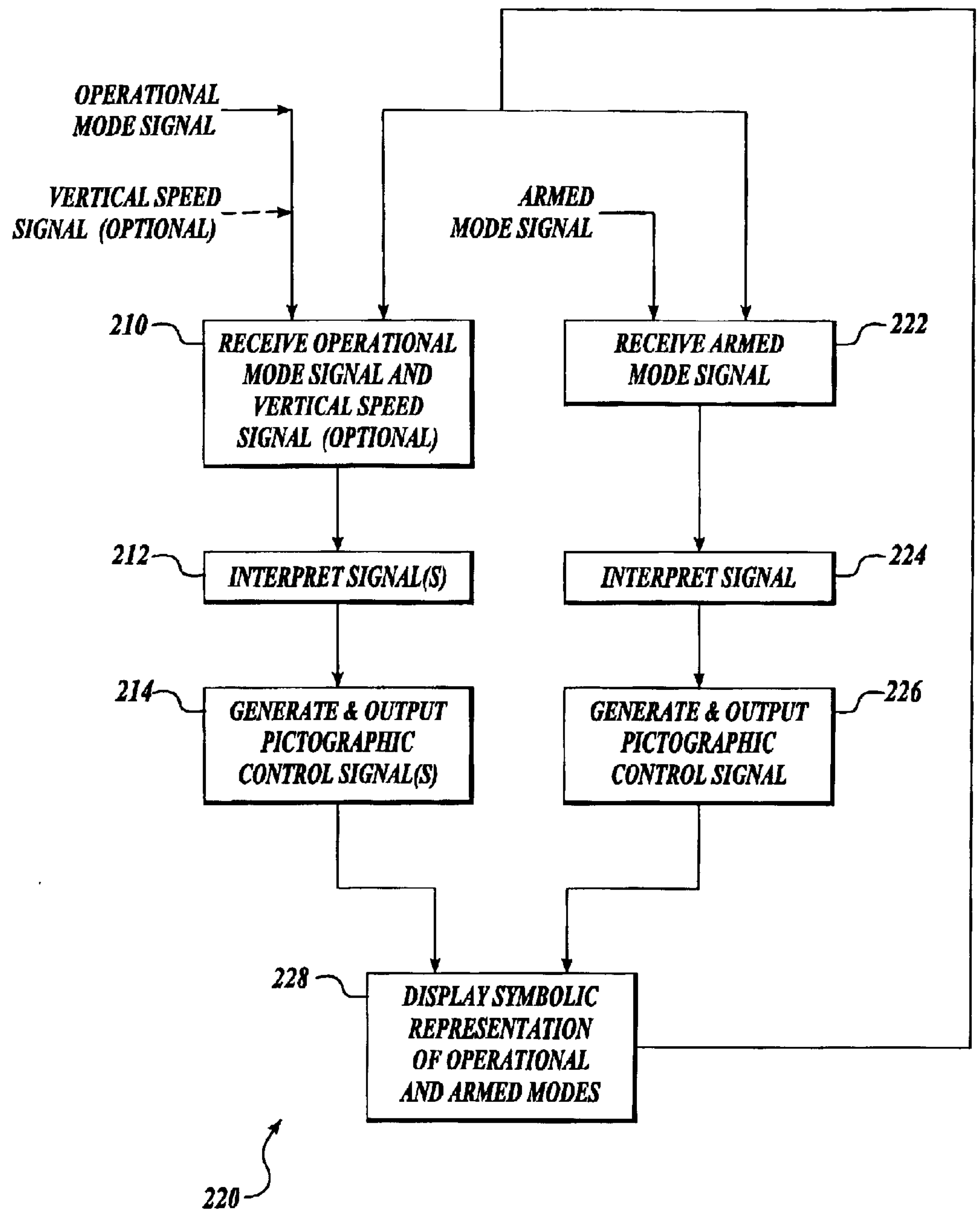
FIG. 6 is a flowchart that illustrates by example and without limitation a different embodiment of the pictographic operational mode enunciator system of the invention having a signal representative of a currently armed but non-operational mode of the instrument received simultaneously or subsequently with the signal representative of a current mode of operation as illustrated in FIG. 5.

FIG. 6 is a flowchart 220 that illustrates by example and without limitation a different embodiment of the pictographic operational mode enunciator system of the invention, wherein a signal representative of a currently armed but non-operational mode of the instrument is received in Block 222 simultaneously (parallel operation as shown) or subsequently (serial operation) with the signal representative of a current mode of operation received in Block 210. In Block 224 the received armed mode signal is interpreted to determine the currently armed mode of operation of the system. In Block 226 a control signal informing a pictographical representation symbolic of the currently armed mode of operation is generated and output. The control signal informing a pictographical representation symbolic of the currently armed mode of operation may be generated and output in independently (shown) or in combination with the display control signal informing a pictographical representation symbolic of the current mode of operation that is generated and output in Block 214 (shown in FIG. 5). In Block 228 a pictographical representation of the currently armed mode of operation, i.e., the armed mode enunciator 18, is displayed in a de-emphasized format on the cockpit panel display in combination with the emphasized pictographical representation of the current mode of operation, current mode enunciator 16, generated in Block 214 from the signal received in Block 210 and interpreted in Block 212, as discussed above. The system loops to continuously sample the mode signal whereby the displayed pictographical representations of the current and armed modes of operation are continuously updated.

Figure 7:
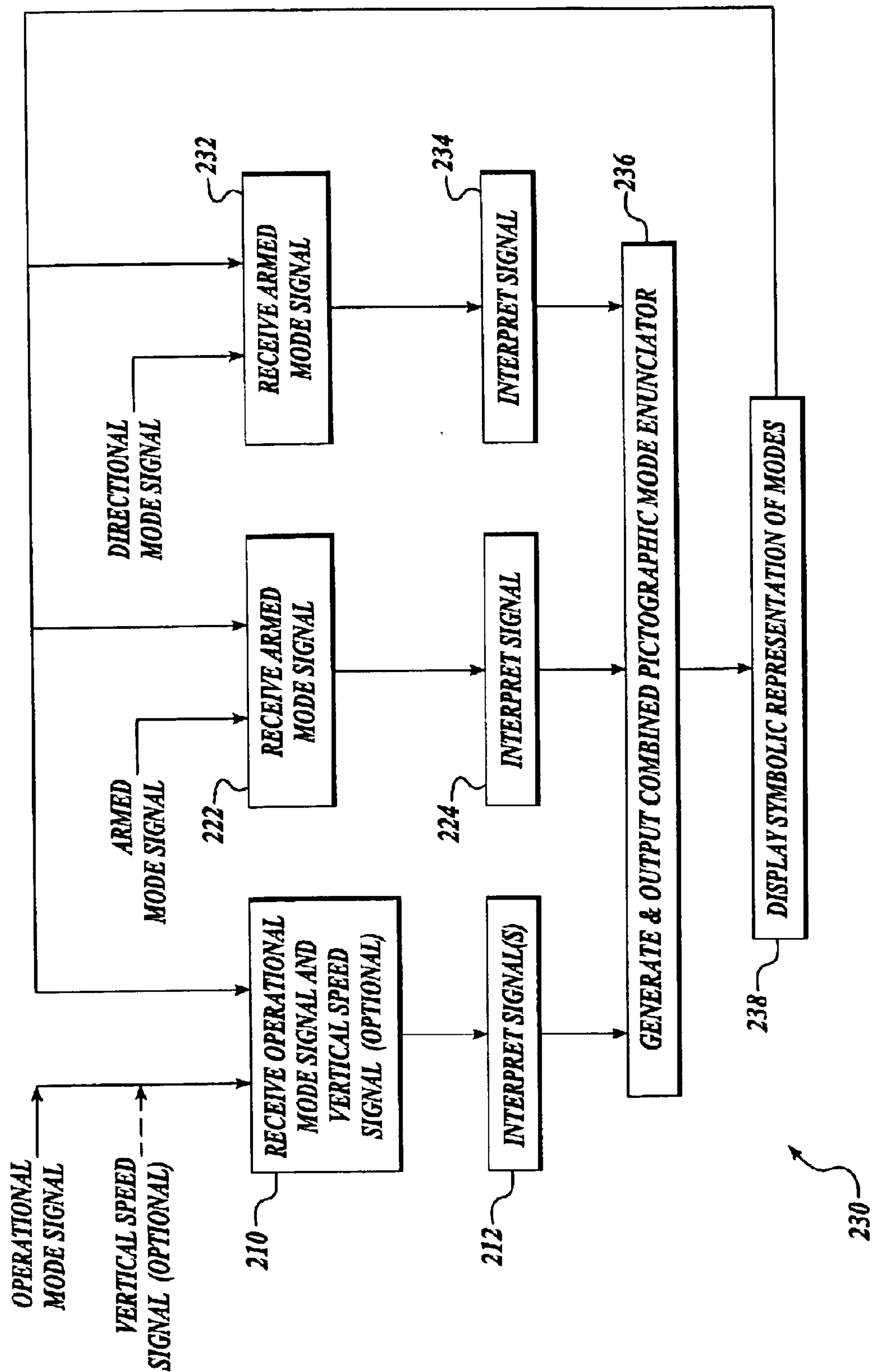
FIG. 7 is a flowchart that illustrates by example and without limitation yet another different embodiment of the pictographic operational mode enunciator system of the invention having a vertical direction signal representative of a currently level, ascending or descending directional flight mode of the aircraft received simultaneously or subsequently with the signal representative of a current mode of operation as illustrated in FIG. 5 and the signal representative of a currently armed but non-operational mode of the instrument as illustrated in FIG. 6.

FIG. 7 is a flowchart 230 that illustrates by example and without limitation yet another different embodiment of the pictographic operational mode enunciator system of the invention, wherein a vertical direction signal representative of a currently level, ascending or descending directional flight mode of the aircraft is received in Block 232. The directional flight mode information is received simultaneously (parallel operation shown) or subsequently (serial operation) with the signal representative of a current mode of operation received in Block 210 and the signal representative of a currently armed but non-operational mode of the instrument received in Block 222. The directional mode signal may be, for example, the vertical speed signal having the signed value of vertical speed. In Block 234 the received direction mode signal is interpreted to determine the currently level, ascending or descending flight mode of the aircraft, including the rate of climb or descent.

In Block 236 a control signal informing a pictographical representation symbolic of the currently ascending or descending flight mode is generated and output. The pictorial directional mode control signal may include information informing a slope of the pictographical representation symbolic of the current rate of vertical change. The control signal informing a pictographical representation symbolic of the currently ascending or descending mode may be generated and output in independently or in combination (shown) with one or both of the display control signal informing the pictographical representation symbolic of the current mode of operation that is generated and output in Block 214 (shown in FIG. 5) and the control signal informing the pictographical representation symbolic of the currently armed mode of operation that is generated and output in Block 226 (shown in FIG. 6).

In Block 238 a pictographical representation of the current level, ascending or descending flight mode of the aircraft, i.e., directional mode enunciator 20, is displayed in combination with the emphasized pictographical representation of the current mode of operation, i.e., current mode enunciator 16, generated in Block 214 from the signal received in Block 210 and interpreted in Block 212, and with the de-emphasized pictographical representation of the currently armed mode of operation, i.e., armed mode enunciator 18, generated in Block 226 from the signal received in Block 222 and interpreted in Block 224, as discussed above. The system loops to continuously sample the mode signal(s) whereby the displayed pictographical representation of the current ascending or descending mode of the aircraft is continuously updated along with the pictographical representations of the current operational and armed modes of operation.

Figure 8:
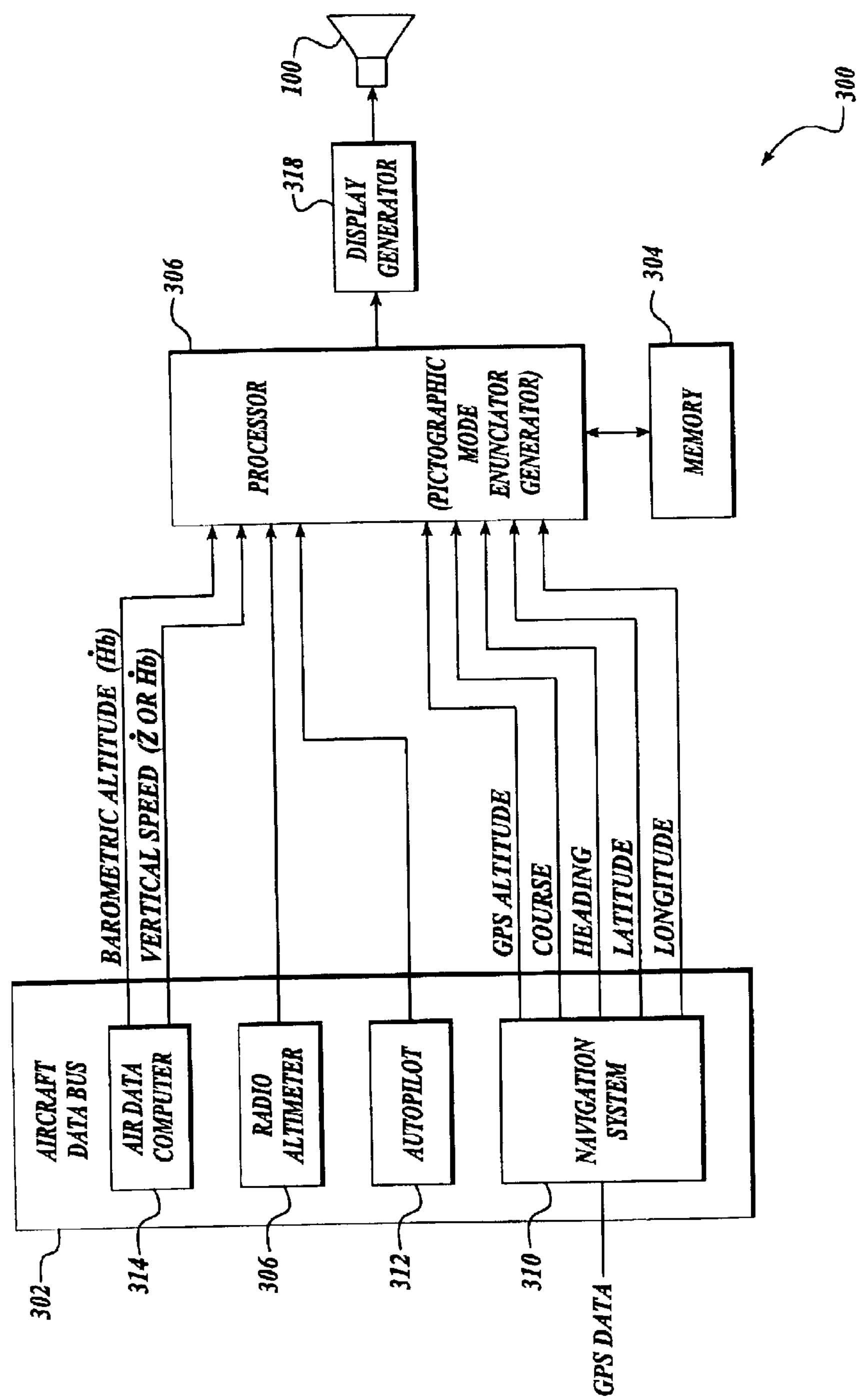
FIG. 8 illustrates by example and without limitation an embodiment of the pictographic operational mode enunciator system of the invention embodied as an instrument system pictographic operational mode enunciator system of the invention embodied in an aircraft environment.

FIG. 8 illustrates by example and without limitation an embodiment of the pictographic operational mode enunciator system of the invention embodied as an instrument system pictographic operational mode enunciator system 300 of the invention embodied in an aircraft environment. Accordingly, various signals are provided to the pictographic mode enunciator system 300 of the invention for generating and displaying one or more of the operational, armed and directional mode enunciators 16, 18, 20 exemplified in FIGS. 1–4. For example, either an aircraft data bus 302 or another suitable means for providing real-time electronic signal data provides the various signals to the pictographic mode enunciator system 300 for generating and displaying the mode enunciators 16, 18, 20. A detailed description of the signals available on an aircraft data bus 302 is provided by the ARINC Characteristic 429 as published by Aeronautical Radio, Incorporated of Annapolis, Md., which is incorporated in its entirety herein by reference. Included in the signals provided by the aircraft data bus 302 or other suitable source are at least an autopilot mode signal; a vertical speed signal; and navigation signals including GPS altitude, course, heading, latitude and longitude signals. These signals are used as inputs to a pictographic mode enunciator circuit, which in turn is effective to generate a pictographic mode enunciator signal whenever the navigation and autopilot systems are operational. The pictographic mode enunciator signal is applied to a display generator, that in turn generates a pictographic mode enunciator signal that results in one or more of the pictographic mode enunciators 16, 18 and 20 being displayed on the display 100.

The functional processes indicated in the block diagrams of one or more of FIGS. 5, 6 and 7 can be implemented as hardwired logic by an application specific integrated circuit (ASIC) (not shown) which are generally well known. As an alternative to using an ASIC or other dedicated logic circuit for processing an input signal to generate a pictographic mode enunciator control signal in accord with the present invention, a general purpose processor can be employed for this purpose.

For example, a pictographic mode enunciator system of the invention as embodied in the pictographic mode enunciator system 300 of FIG. 8 includes a plurality of machine instructions stored in an onboard memory 304, which are retrieved and operated by a processor 306 to generate one or more of the operational, armed and directional mode enunciators 16, 18, 20. The processor 306 uses data received from a navigation system 310 and an autopilot system 312 on the aircraft to provide current information about the mode of operation of the aircraft navigation and autopilot systems and the vertical speed of the aircraft. The navigation data may be obtained directly from the navigation system, which may include an inertial navigation system, a satellite navigation receiver such as a global positioning system (GPS) receiver, VLF/OMEGA, Loran C, VOR/DME or DMF/DME, or from a flight management system (FMS).

Information about the vertical speed of the aircraft is available from the navigation system 310, from an air data computer 314, or from a barometric altimeter and a barometric rate circuit present on the aircraft. The vertical speed may be expressed as a barometric rate, or as Z velocity, which may be obtained from an onboard inertial navigation system. Alternatively, the pictographic mode enunciator system 300 utilizes altitude signals from a radio altimeter 316 which is available on the aircraft data bus 302. The altitude signals are optionally geometric altitude signals generated by the computer processor 306 as a blended combination of the instantaneous GPS altitude signal and the barometric altitude signal as described by Johnson et al. in U.S. Pat. No. 6,216,064, entitled METHOD AND APPARATUS FOR DETERMINING ALTITUDE, which is incorporated in its entirety herein by reference and is owned by the assignee of the present application. Methods and apparatus for determining altitude, specifically altitude in an aircraft, and an estimated error of the altitude are described in U.S. Pat. No. 6,216,064. The altitude determination preferably uses a first altitude based on hydrostatic calculations, including local pressure and temperature, as well as a second altitude which is preferably a GPS altitude. A radio altimetry can also be used instead of or to complement the GPS altitude. Other sources of altitude determination can be used in the equation for the calculation of the final altitude. Each of the sources of altitude determination is provided with a complementary estimated error. In the final determination of the probable altitude, each source of altitude information may accorded a weighting according to the estimated error of the altitude source. For global positioning altitude, the final combination of the altitude sources may use a complementary filter which takes into account the selective availability of the GPS altitude. This accounts for the long-term accuracy but short-term inaccuracy of GPS altitude. Corrections are provided to account for horizontal changes in pressure gradient as the aircraft moves from an origin to a destination. The invention described in U.S. Pat. No. 6,216,064 further provides for the altitude to be corrected based on non-standard atmospheric temperature (ISA) variations. In operating the method of U.S. Pat. No. 6,216,064, the computer processor 306 and memory 304 are configured to receive the altitude information and make the necessary calculations to result in an estimate of the current vertical speed which is then made available to the pictographic mode enunciator system 300 of the invention. The computer processor 306 includes inputs to receive sources of altitude information.

A data signal from the navigation system 310 and autopilot system 312 may be used to indicate whether the navigation system 310 and autopilot system 312 are available to provide navigation and autopilot status information signals.

The signals 310, 312 from the navigation and autopilot systems are applied to the processor 306 for enabling the pictographic mode enunciator system 300. When navigation and autopilot status information signals are received, the signals are interrogated to determine whether a pictographic mode enunciator system is available for one or both of the navigation and autopilot systems, and whether one or more of the operational, armed and directional mode signals are available for display.

The availability of the one or more mode signals stimulates the pictographic mode enunciator generator operated by the processor 306 to receive the one or more available mode signals. The pictographic mode enunciator logic resident on the processor 306 uses the available operational, armed and directional mode data supplied by the signals from the navigation and autopilot systems 310, 312 (shown) or information from the flight plan stored in the onboard FMS to determine one or more of the current mode of operation, the armed mode of operation, an the current directional mode of the aircraft. The processor 306 operates an algorithm for generating the mode enunciators, including the operational, armed and directional mode enunciator signals 16, 18, 20, and current vertical speed enunciator 22, as illustrated in FIGS. 1–3.

Using the current operational and armed mode information supplied by the signals from the navigation and autopilot systems 310, 312, the pictographic mode enunciator generator is operated by the processor 306 to determine the currently operational and armed modes of operation of the system. The processor 306 generates the control signal informing a pictographical representation symbolic of the current mode of operation in an emphasized format and outputs the control signal to a cockpit panel display, such as the PFD 100 illustrated in FIG. 4. According to one embodiment of the invention, the current operational mode enunciator 16 is thereby displayed on a cockpit display for informing the pilot of the system information.

Simultaneously (using parallel processing) or subsequently (using serial processing) with generating the current operational mode control signal, the processor 306 generates the control signal informing a pictographical representation symbolic of the currently non-operational armed mode of operation in a de-emphasized format and outputs the armed mode control signal to the cockpit panel display. Thus, according to another embodiment of the invention, the armed mode enunciator 18 is thereby displayed on a cockpit display in combination with the current mode enunciator 16 for informing the pilot of the system information.

Using the current vertical speed information supplied by the air data computer 314 or another suitable instrument, the pictographic mode enunciator generator is operated by the processor 306 to determine a current vertical speed of the aircraft. The processor 306 generates the control signal informing a pictographical representation symbolic of the current vertical speed and outputs the vertical speed control signal for display. Thus, according to another embodiment of the invention, the arrow pictogram directional enunciator 20 is displayed on the cockpit panel display in combination with the emphasized pictographical representation of the current mode of operation, the current mode enunciator 16.

The arrow pictogram directional enunciator 20 displayed on the cockpit panel display is, for example, a simple upwardly pointing indicator for a currently ascending flight mode, a downwardly pointing indicator for a currently descending flight mode, and a horizontally pointing indicator for a currently level flight mode. According to one embodiment of the invention, the arrow pictogram directional enunciator 20 is displayed on the cockpit panel display being upwardly and downwardly pointing at fixed angles regardless of the aircraft's determined angle of ascent or descent. For example, the arrow pictogram directional enunciator 20 is displayed on the cockpit panel display at positive and negative 15, 30, 45 or 90 degree angles for indicating current ascending or descending modes of flight.

According to yet another embodiment of the invention, the pictographic mode enunciator generator is operated by the processor 306 to determine a value of the current directional flight mode of the aircraft. The pictographic mode enunciator generator is operated by the processor 306 to use the value of the vertical speed to inform the slope of the arrow pictogram directional enunciator 20 as displayed on the aircraft display 100. The arrow pictogram directional enunciator 20 is thus displayed having an upwardly or downwardly directed slope that is substantially proportional to or otherwise representative of the value of the vertical speed during an ascending or descending directional flight mode, while the arrow pictogram directional enunciator 20 is displayed as being substantially horizontal during substantially level flight.

Because aircraft typically climb and descend at shallow angles on the order of 6 degrees or less, the variation in slope between a shallow and steep climb may not be obviously represented on the display. Therefore, according to one embodiment of the invention, the pictographic mode enunciator generator is operated by the processor 306 to exaggerate the variation in slope between a shallow and steep angles of ascent and descent by, for example, adjusting the slope of the arrow pictogram directional enunciator 20 as displayed on the aircraft display 100 according to a variable, geometric, exponential, or logarithmic function of the angle of the measured slope.

The pictographic mode enunciator generator of the invention is operated by the processor 306 to generate display control signals that indicate one or more of the operational, armed and directional mode enunciators 16, 18, 20. The display signals are output to a display generator 318 that interprets the display control signal(s) to generate the one or more operational, armed and directional mode enunciators 16, 18, 20 on the display 100 in the fashion illustrated in FIGS. 1–4 or a substantially equivalent fashion. Thus, the display generator 318 interprets the display control signal to generate a pattern of pictographic mode enunciators 16, 18, 20, 22 on the display 100 such that respectively indicate the current operational and armed modes of the navigation and autopilot systems and the current directional flight mode of the aircraft.

Furthermore, the display generator 318 interprets the display control signals to generate contrasting transition colors, shades or illumination levels between currently operational and armed modes such that, as illustrated in FIGS. 1–4, the operational mode pictographic enunciator 16 is emphasized (shown shaded) to indicate the currently operational condition, while the armed mode pictographic enunciator 18 is de-emphasized to indicate the currently non-operational condition.

Additionally, the display generator 318 interprets the display control signal to generate the directional flight mode enunciator 20 such that, as illustrated in FIGS. 1–4, the display provides a visual representation of the current level, ascending or descending mode of flight for the pilot to observe and interpret using a minimum of cognitive resources.

According to one embodiment of the invention, one or more of the pictographic mode enunciators 16, 18, 20, 22 are displayed on the display 100, which is embodied as a liquid crystal display (LCD). When the display 100 is embodied as a color LCD, the pictographic mode enunciators 16, 18, 20, 22 are displayed as described above. However, when the display 100 is embodied as a black and white LCD, the pictographic mode enunciators 16, 18, 20, 22 are displayed in shades of gray, for example, as illustrated in FIGS. 1–4.

The pictographic mode enunciators 16, 18, 20, 22 of the invention thus provide the pilot additional color coded pictographic information. The symbology of the pictographic mode enunciators 16, 18, 20, 22 facilitates basic, simple, perceptual interpretations for determining the status of the navigation and autopilot systems. The color coding provides pre-attentive context that informs the pilot whether the mode is currently operational or currently armed but non-operational, the pilot then further interrogates the display, i.e., visually determines the alphanumeric mode enunciator, to determine the currently operational and armed modes of the navigation and autopilot systems. The pictographic directional mode enunciator 20 provides pre-attentive context that informs the pilot whether the aircraft is currently in a climb or descent mode of flight. The pre-attentive information that the arrow or pointer and color-coding provides shortens pilot response time and reduces the cognitive resources required of the pilot to interpret the information.

In addition to being practiced as apparatus and methods, the present invention is also practiced as a computer program product for enunciating current and armed operational modes of the navigation and autopilot systems, as well as current vertical speed value and slope. The computer program product of the invention includes a computer-readable storage medium having computer-readable program code means embodied in the medium. With reference to FIG. 8, the computer-readable storage medium may be part of the memory device 304, and the processor 306 of the present invention implements the computer-readable program code means to determine current and armed operational modes of the navigation and autopilot systems, as well as current vertical speed value and slope and generate a control signal informing a pictographical representation symbolic of the current and armed modes of operation, and the current value and slope of vertical speed.

The computer-readable program code means includes a first computer-readable program code means for receiving a signal representative of a current mode of operation of one or more instrument systems, such as navigation and autopilot instrument systems; a second computer-readable program code means for determining a current mode of operation of the instrument system from the current mode of operation receive by the first computer-readable program code means; and a third computer-readable program code means for generating and outputting a display control signal informing a pictographical representation symbolic of the current mode of operation determined from the second computer-readable program code means.

With reference to the first computer-readable program code means, as discussed previously with respect to the various apparatus and methods of the present invention, the first computer-readable program code means, that for receiving a signal representative of a current mode of operation of the system, may additionally include computer-readable program code means for either simultaneously (parallel processing) or subsequently (serial processing) receiving a signal representative of a current vertical speed of the aircraft. When the first computer-readable program code means so includes computer-readable program code means for receiving a signal representative of a current vertical speed of the aircraft, the second computer-readable program code means, that for determining a current mode of operation of the instrument system, may additionally include computer-readable program code means for either simultaneously (parallel processing) or subsequently (serial processing) determining the current vertical speed of the aircraft. When the second computer-readable program code means so includes computer-readable program code means for determining the current vertical speed of the aircraft, the third computer-readable program code means, that for generating and outputting a display control signal informing a pictographical representation symbolic of the current mode of operation of the system, may additionally include computer-readable program code means for either simultaneously (parallel processing) or subsequently (serial processing) generating and outputting a display control signal informing an alphanumeric representation of the value of the current vertical speed in combination with the display control signal informing a pictographical representation symbolic of the current mode of operation.

As discussed previously with respect to the various apparatus and methods of the present invention, the computer program product may further include a fourth computer-readable program code means for receiving a signal representative of a currently armed but non-operational mode of the instrument. The currently armed but non-operational mode signal is received and processed either simultaneously (parallel processing) or subsequently (serial processing) with the current mode of operation signal. The computer program product may further include a fifth computer-readable program code means for determining a currently armed but non-operational mode of the instrument system.

The computer program product may further include a sixth computer-readable program code means for generating and outputting a display control signal informing a pictographical representation symbolic of the currently armed but non-operational mode of the instrument system determined from the fourth computer-readable program code means.

According to another embodiment of the computer program product of the invention, a seventh computer-readable program code means may either simultaneously (parallel processing) or subsequently (serial processing) with the first computer-readable program code means, that for receiving a signal representative of a current mode of operation of the system and the fourth computer-readable program code means, that for receiving a signal representative of a currently armed but non-operational mode of the instrument, receive a signal representative of a current vertical speed signal representative of the current directional mode of the aircraft, the directional mode signal having the signed value of vertical speed. The computer program product may further include an eighth computer-readable program code means for processing the current directional mode signal received by the seventh computer-readable program code means and determining a currently level, ascending or descending flight mode of the aircraft. The eighth computer-readable program code means may be either simultaneously (parallel processing) or subsequently (serial processing) operated with the second computer-readable program code means, that for determining a current mode of operation of the instrument system, and the fifth computer-readable program code means, that for determining a currently armed but non-operational mode of the instrument system. The computer program product may further include a ninth computer-readable program code means for generating from the current level, ascending or descending flight mode determined by the eighth computer-readable program code means a display control signal informing a pictographical representation symbolic of the current level, ascending or descending flight mode and outputting the display control signal. The ninth computer-readable program code means may be either simultaneously (parallel processing) or subsequently (serial processing) operated with the third computer-readable program code means, that for generating and outputting a display control signal informing a pictographical representation symbolic of the current mode of operation of the instrument system, and the sixth computer-readable program code means, that generating and outputting a display control signal informing a pictographical representation symbolic of the currently armed but non-operational mode of the instrument system.

With regard to the seventh computer-readable program code means, that for receiving a signal representative of a current vertical speed signal representative of the directional mode of the aircraft, the function of the seventh computer-readable program code means may be combined with the first computer-readable program code means for receiving a signal representative of a current mode of operation of the system, which, according to one embodiment of the invention, may additionally include computer-readable program code means for either simultaneously (parallel processing) or subsequently (serial processing) receiving a signal representative of a current vertical speed of the aircraft.

With regard to the eighth computer-readable program code means, that for processing the directional mode signal received by the seventh computer-readable program code means and determining a currently level, ascending or descending flight mode, the eighth computer-readable program code means may additionally include computer-readable program code means for processing the directional mode signal and determining a rate of climb or descent of the aircraft.

With regard to the ninth computer-readable program code means, that for generating from the current level, ascending or descending flight mode determined by the eighth computer-readable program code means a display control signal informing a pictographical representation symbolic of the current level, ascending or descending flight mode and outputting the display control signal, the ninth computer-readable program code means may additionally include computer-readable program code means for informing a slope of the pictographical representation symbolic of the current rate of vertical change, i.e., the current rate of ascent or descent of the host aircraft. The pictographical representation of the slope is substantially proportional to the rate of climb or descent of the aircraft determined in the eighth computer-readable program code means. According to various other embodiments of the invention, the pictographical representation of the slope is provided as being one of a variable, geometric, exponential, or logarithmic function of the angle of the measured rate of climb or descent of the aircraft determined in the eighth computer-readable program code means, or a combination of one or more of the variable, geometric, exponential, or logarithmic function of the angle of the measured rate of climb or descent of the aircraft determined in the eighth computer-readable program code means.

While the preferred embodiment of the invention has been illustrated and described, it will be appreciated that various changes can be made therein without departing from the spirit and scope of the invention.

What is claimed is:

1. A pictographic display of an operational mode of an instrument or instrument system, the pictographic display comprising:

a graphical display device;

a pictographic symbol displayed on the display device, the pictographic symbol comprising:

an enunciator symbolic of a current operational state of the instrument or instrument system, an enunciator symbolic of a next operational state of the instrument or instrument system, and an enunciator symbolic of a current mode of flight of an aircraft having the display device resident thereon.

2. The display of claim 1 wherein the enunciator symbolic of a current operational state further comprises an alphanumeric enunciator.

3. The display of claim 1 wherein the enunciator symbolic of a current operational state further comprises an emphasized enunciator.

4. The display of claim 1 wherein the enunciator symbolic of a current operational state is further displayed within an emphasized area of a pictographic display.

5. The display of claim 1 wherein the enunciator symbolic of a next operational state further comprises an alphanumeric enunciator.

6. The display of claim 1 wherein the enunciator symbolic of a current mode of flight further comprises a directional enunciator.

7. The display of claim 1 wherein the enunciator symbolic of a current mode of flight further comprises a pointer symbol.

8. A pictographic display comprising:

first and second coexisting adjacent display portions;

first pictographic symbology associated with the first display portion and being representative of a currently operational state of an instrument; and second pictographic symbology associated with the second display portion and being representative of a currently armed but non-operational state of the instrument.

9. The display of claim 8 wherein the first display portion further comprises a visually emphasized background portion.

10. The display of claim 8 wherein the first pictographic symbology further comprises an alphanumeric enunciator associated with the first portion.

11. The display of claim 10 wherein the alphanumeric enunciator associated with the first portion further comprises a visually emphasized alphanumeric enunciator.

12. The display of claim 8, further comprising a directional indicator associated with the first display portion and being representative of a current vertical speed of an aircraft having the pictographic display displayed thereon.

13. The display of claim 8, further comprising a computer program structured to:

receive a first signal representative of a currently operational state of the instrument and a second signal representative of a currently armed but non-operational state of the instrument;

generate the first and second coexisting adjacent display portions and the first and second pictographic symbologies; and output one or more signals representative of the first and second coexisting adjacent display portions and the first and second pictographic symbologies.

14. A device for generating a pictographic representation of an operational mode of an instrument, the device comprising:

means for receiving a signal representative of a current mode of operation of an instrument system;

means for determining from the received signal a current mode of operation of the instrument system;

means for generating a control signal informing a pictographic representation symbolic of the current mode of operation and a next mode of operation; and means for outputting the control signal.

15. The device of claim 14 wherein the means for generating a control signal informing a pictographic representation symbolic of the current mode of operation further comprises means for applying visual emphasis to the pictographic representation.

16. The device of claim 14, further comprising:

means for receiving a signal representative of a currently armed mode of operation of the instrument system;

means for determining from the received currently armed mode of operation signal a currently armed mode of operation of the instrument system;

means for generating a control signal informing a pictographic representation symbolic of the currently armed mode of operation; and means for outputting the currently armed mode control signal.

17. The device of claim 14, further comprising:

means for receiving a signal representative of a current mode of flight of an aircraft having the instrument system resident thereon;

means for determining from the received current mode of flight signal a current mode of flight of the aircraft;

means for generating a control signal informing a pictographic representation symbolic of the current mode of flight; and means for outputting the current mode of flight control signal.

18. The device of claim 14, further comprising:

means for receiving a signal representative of a vertical speed of an aircraft having the device resident thereon;

means for determining from the received signal a vertical speed of the aircraft;

means for generating a control signal informing a pictographic representation symbolic of the vertical speed of the aircraft; and means for outputting the vertical speed control signal.

19. The device of claim 18 wherein the means for determining the vertical speed of the aircraft further comprises means for determining a sign of the vertical speed.

20. The device of claim 19 wherein the means for generating a control signal informing a pictographic representation symbolic of the vertical speed of the aircraft further comprises means for generating a control signal informing a signed pictographic representation symbolic of the vertical speed.

21. An aircraft cockpit display comprising:

a memory having a plurality of machine instructions stored thereon for generating a display control signal representative of a pictographic enunciator symbolizing a current operational state and an alternate operational state of an onboard instrument or instrument system;

a processor coupled to receive a signal representative of a currently operational mode of the onboard instrument or instrument system, the processor being further coupled to retrieve and operate the plurality of machine instructions stored on the memory for generating the pictographic enunciator display control signal;

a display generator coupled to receive display control signal, the display generator being structured to interpret the display control signal to generate the pictographic enunciator; and a graphical display device coupled to the display generator and structured to display the pictographic enunciator.

22. The display of claim 21 wherein the plurality of machine instructions stored on the memory further comprise machine instructions for generating a display control signal representative of a pictographic enunciator symbolizing a currently armed but non-operational state of the onboard instrument or instrument system; and the processor is further coupled to receive a signal representative of the currently armed but non-operational state of the onboard instrument or instrument system.

23. The display of claim 21 wherein the plurality of machine instructions stored on the memory further comprise machine instructions for generating a display control signal representative of a pictographic enunciator symbolizing a flight mode of an aircraft hosting the cockpit display; and the processor is further coupled to receive a signal representative of the flight mode of the host aircraft.

24. The display of claim 21 wherein the plurality of machine instructions stored on the memory further comprise machine instructions for generating a display control signal representative of a pictographic enunciator symbolizing a vertical speed of an aircraft hosting the cockpit display; and the processor is further coupled to receive a signal representative of the vertical speed of the host aircraft.

25. A method for generating a pictographic representation of an operational mode of an instrument, the method comprising:

receiving a signal representative of a currently operational mode of operation of an instrument system;

determining the currently operational mode of operation of the instrument system;

generating a control signal informing a pictographic representation symbolic of the currently operational mode of operation and a next mode of operation; and outputting the currently operational control signal.

26. The method of claim 25, further comprising displaying the pictographical representation of the currently operational mode of operation on a display device.

27. The method of claim 25 wherein the pictographic representation symbolic of the currently operational mode of operation further comprises a visually emphasized operational mode area having positioned therein a visually emphasized alphanumeric operational mode enunciator that announces the currently operational mode of operation.

28. The method of claim 25 wherein the visually emphasized operational mode area includes positioned therein a current mode of flight indicator.

29. The method of claim 28 wherein the current mode of flight indicator further comprises a visual directional enunciator that visually indicates a current mode of flight of a host aircraft.

30. The method of claim 25, further comprising predicting a next mode of operation of the instrument system.

31. The method of claim 30 wherein predicting a next mode of operation of the instrument system further comprises:

receiving a signal representative of an armed mode of operation of an instrument system;

determining the currently armed mode of operation of the instrument system;

generating a control signal informing a pictographic representation symbolic of the currently armed mode of operation; and outputting the currently armed mode control signal.

32. A method for using an electronic circuit to convert a signal conveying data as an operational mode of an instrument system for display as a pictographic representation of an operational mode and a next mode of the instrument system, the method comprising:

a) processing the signal as a signal representative of a current mode of operation of one or more of an instrument and an instrument system;

b) with the electronic circuit, determining a current mode of operation of the one or more of an instrument and an instrument system;

c) with the electronic circuit, generating a control signal informing a pictographic representation descriptive of the current mode of operation; and d) with the electronic circuit, outputting the control signal.

33. The method of claim 32 wherein generating a control signal informing a pictographic representation descriptive of the current mode of operation further comprises applying a visual emphasis to the pictographic representation.

34. The method of claim 32, further comprising displaying the pictographic representation.

35. A computer program, comprising:

a first computer-readable program code means for receiving a signal representative a current mode of operation of one or more instrument systems;

a second computer-readable program code means for determining a current mode of operation of the instrument system from the current mode of operation receive by the first computer-readable program code means; and a third computer-readable program code means for generating and outputting a display control signal informing a pictographical representation symbolic of the current mode and a next mode of operation determined from the second computer-readable program code means.

36. The computer program of claim 35 wherein the first computer-readable program code means for receiving a signal representative of a current mode of operation of the instrument system further comprises computer-readable program code means for receiving a signal representative of a current vertical speed of the aircraft.

37. The computer program of claim 36 wherein the second computer-readable program code means for determining a current mode of operation of the instrument system further comprises computer-readable program code means for determining the current vertical speed of the aircraft.

38. The computer program of claim 37 wherein the third computer-readable program code means for generating and outputting a display control signal informing a pictographical representation symbolic of the current mode of operation of the system further comprises computer-readable program code means for generating and outputting a display control signal informing an alphanumeric representation of the value of the current vertical speed.

39. The computer program of claim 38 wherein the third computer-readable program code means for generating and outputting a display control signal informing a pictographical representation symbolic of the current mode of operation of the system further comprises computer-readable program code means for generating and outputting a display control signal informing an alphanumeric representation of the value of the current vertical speed further comprises means for generating and outputting the display control signal informing an alphanumeric representation of the value of the current vertical speed in combination with the display control signal informing a pictographical representation symbolic of the current mode of operation.

40. The computer program of claim 35, further comprising:

a fourth computer-readable program code means for receiving a signal representative of a currently armed but non-operational mode of the instrument;

a fifth computer-readable program code means for determining a currently armed but non-operational mode of the instrument system; and a sixth computer-readable program code means for generating and outputting a display control signal informing a pictographical representation symbolic of the currently armed but non-operational mode of the instrument system determined from the fourth computer-readable program code means.

41. The computer program of claim 35, further comprising:

a fourth computer-readable program code means for receiving a signal representative of a current directional mode of an aircraft having the computer program operating thereon a fifth computer-readable program code means for processing the current directional mode signal received by the fourth computer-readable program code means and determining a flight mode of the aircraft;

a sixth computer-readable program code means for generating from the determined current flight mode a display control signal informing a pictographical representation symbolic of the determined current flight mode and outputting the display control signal.

42. The computer program of claim 41 wherein the flight mode of the aircraft determined by the fifth computer-readable program code means further comprises one of a level, an ascending and a descending flight mode.

43. The computer program of claim 41 wherein the fourth computer-readable program code means for receiving a signal representative of a current directional mode of the aircraft further comprises computer-readable program code means for receiving a signal representative of a current vertical speed of the aircraft.

44. The computer program of claim 43 wherein the fifth computer-readable program code means for processing the received directional mode signal and determining a current flight mode further comprises computer-readable program code means for processing the directional mode signal for determining a current vertical rate of climb or descent of the aircraft.

45. The computer program of claim 44 wherein the sixth computer-readable program code means for generating a display control signal informing a pictographical representation symbolic of the determined current flight mode and outputting the display control signal further comprises means for informing a slope of the pictographical representation symbolic of the current vertical rate of climb or descent of the aircraft.

46. The computer program of claim 45 wherein the pictographical representation of the slope of the pictographical representation symbolic of vertical rate further comprises a slope that is substantially proportional to the current vertical rate of climb or descent of the aircraft determined by the fifth computer-readable program code means.

47. The computer program of claim 45 wherein the pictographical representation of the slope of the pictographical representation symbolic of vertical rate further comprises a slope that is one of a variable, a geometric, an exponential, and a logarithmic function of the angle of the current rate of climb or descent of the aircraft determined by the fifth computer-readable program code means.

* * * * *